United States Patent [19]

Schaffer

[11] 4,020,699

[45] May 3, 1977

[54] TEMPERATURE STABILIZED FLUIDIC ANGULAR RATE SENSOR

[75] Inventor: Max A. Schaffer, Fairfield, Conn.

[73] Assignee: United Technologies Corporation, Hartford, Conn.

[22] Filed: Feb. 5, 1976

[21] Appl. No.: 655,345

[52] U.S. Cl. .............................. 73/497; 73/516 LM
[51] Int. Cl.² ........................................ G01P 15/08
[58] Field of Search ..................... 73/497, 516 LM

[56] References Cited

UNITED STATES PATENTS

| | | | |
|---|---|---|---|
| 3,587,328 | 6/1971 | Schuemann | 73/516 LM |
| 3,631,729 | 1/1972 | Moore | 73/516 LM |

Primary Examiner—James J. Gill
Attorney, Agent, or Firm—M. P. Williams

[57] ABSTRACT

The measurement bridge of a fluidic angular rate sensor in which a pair of temperature sensitive resistive elements are differentially cooled by a jet of fluid, the direction of which lags the position of the resistive elements when the rate sensor is rotated in the plane of sensitivity, is driven by a constant voltage source through resistances substantially equal to the rate sensing resistive elements so that as the resistive elements increase in resistance with temperature, the voltage also increases, so the power consumption and therefore the heat generated in the resistive elements remains constant, thereby tending to maintain a constant temperature differential of the resistive elements above the ambient, and in turn reducing changes in thermally-induced mechanical stress and resulting motion; further, lack of tracking between the two resistive sensing elements over wide temperature ranges is compensated by coupling some of the resultant temperature-dependent voltage to a bridge node to compensate for the temperature-dependent mismatch, said voltage being nulled at normal temperature by coupling of fixed voltage of opposite polarity to the same node.

2 Claims, 7 Drawing Figures

U.S. Patent   May 3, 1977   4,020,699
FIG.1 (PRIOR ART)
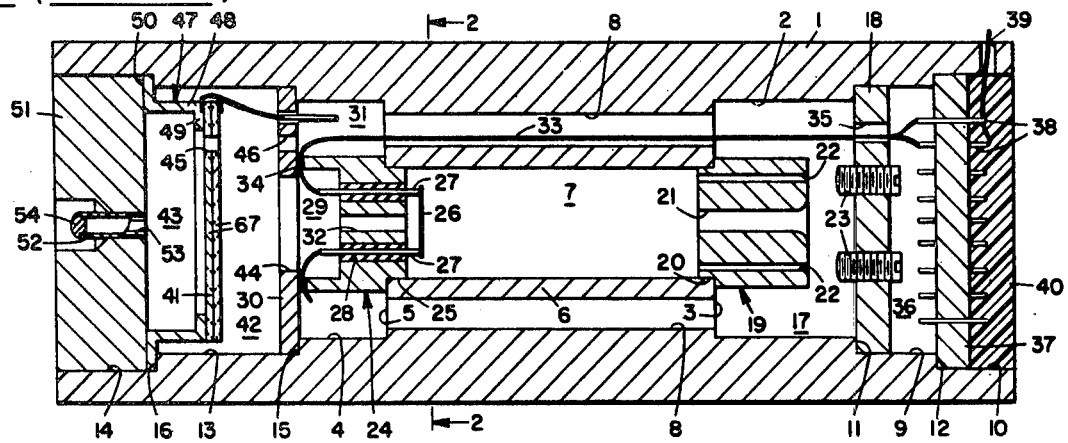
FIG.2 (PRIOR ART)
FIG.3
FIG.4
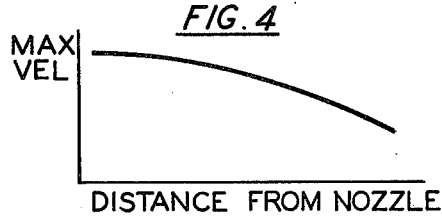
DISTANCE FROM NOZZLE
FIG.5
FIG.6
FIG.7
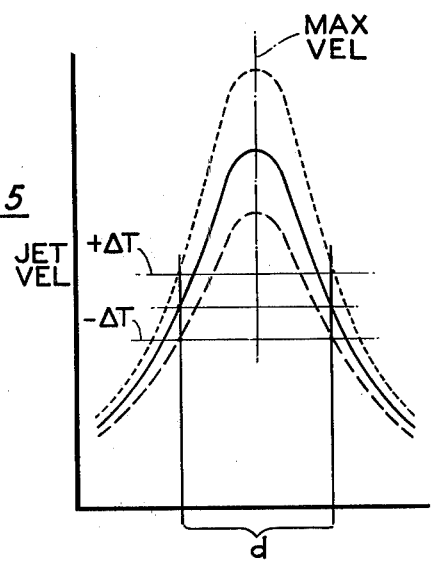

# TEMPERATURE STABILIZED FLUIDIC ANGULAR RATE SENSOR

BACKGROUND OF THE INVENTION

1. Field of Invention

This invention relates to fluidic angular rate sensors and more particularly to improved temperature response in the sensing bridge thereof.

2. Description of the Prior Art

Of the fluidic angular rate sensors known in the art, perhaps the most widely used is the type illustrated in Schuemann U.S. Pat. No. 3,587,328, which comprises a self-contained unit including a piezoelectric diaphragm pump, and a fluid jet (or nozzle) through which a suitable fluid, such as an inert gas, is forced by the pump, thereby providing a charge or stream of gas directed toward a pair of temperature sensitive resistive elements which are differentially cooled by the jet whenever the jet is moved (such as in angular rotation) in a plane of sensitivity. The sensing elements are typically fine tungsten wires disposed on opposite sides of the center line of the nozzle boresight and perpendicular to the plane of sensitivity of the device. This device has found favor in many applications since it has no rotating parts, and substantially no moving parts (none except the vibrating diaphragm of the fluid pump).

Although fluidic angular rate sensors are theoretically capable of design for operation at a wide range of angular rates, it has been found that they are somewhat temperature dependent, particularly over the wide ambient required for military usage (typically, −65° C to +125° C).

SUMMARY OF THE INVENTION

An object of the present invention is to provide improvements in fluidic angular rate sensors, particularly with respect to reducing variations in the response thereof as a function of temperature.

This invention is predicated in part on the discovery that temperature variations in the sensing elements of a fluidic angular rate sensor may be due in part to structural changes resulting from temperature induced stresses; and is further predicated in part on the discovery that the actual resistance of the resistive sensing elements do not track each other perfectly over the design temperature range of a fluidic angular rate sensor.

In accordance with the invention, the temperature differential between the resistive sensing elements in the bridge of a fluidic angular rate sensor and its immediate surroundings is held more nearly constant over a range of ambient temperatures by minimizing the variation in power consumption in the resistive sensing elements as a function of the temperature of the sensing elements. In accordance further with this aspect of the invention, the bridge including resistive sensing elements in a fluidic angular rate sensor is driven by a constant voltage source through fixed resistors, the resistance of which is substantially the same as that of the sensing bridge at a nominal temperature.

According to another aspect of the invention, the voltage driving the sensing bridge of a fluidic angular rate sensor, including temperature-sensitive resistive sensing elements, is allowed to float as a function of the resistance of the elements, the voltage developed across the elements thereby automatically providing temperature tracking for correction of temperature-dependent errors in the sensing circuit including the bridge. According further to this aspect of the invention, the resistance of the reference legs in the sensing bridge of a fluidic angular rate sensor are adjusted to accommodate resistance variations in the bridge elements which occur as a function of temperature excursion, and zero balance of the bridge at a nominal temperature is provided by an additional fixed resistor fed by a constant voltage source.

The present invention provides a more constant temperature differential between the resistive sensing elements and their immediate surroundings, thereby reducing changes in stress in the mechanical joints of the sensing elements with their mountings, which in turn reduces the tendency of these elements to change position relative to the overall apparatus, and therefore relative to the jet stream which selectively cools them according to angular rate along the plane of sensitivity. By causing the voltage across the bridge to track temperature, the invention also allows application of automatic temperature input to the bridge, thereby automatically compensating for temperature-induced resistance changes in the bridge elements.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a simplified, axial, sectioned side elevation view of a fluidic angular rate sensor of the type known to the prior art, in which the present invention may be incorporated;

FIG. 2 is a sectioned elevation view taken on the line 2—2 in FIG. 1;

FIG. 3 is a simplified side elevation view of a resistive sensing element of a fluidic angular rate sensor;

FIG. 4 is a simplified illustration of the reduction of the maximum velocity of the jet stream as a function of distance from the nozzle;

FIG. 5 is a simplified illustration of the transverse velocity characteristics across the jet chamber of a fluidic angular rate sensor;

FIG. 6 is a simplified schematic block diagram of a first embodiment of the present invention; and FIG. 7 is a simplified schematic block diagram of a second embodiment of the invention.

DESCRIPTION OF THE PREFERRED EMBODIMENT

As an example of the environment in which the present invention may be used, consider a fluidic angular rate sensor of the type described in the aforementioned Schuemann U.S. Pat. No. 3,587,328, as shown in FIGS. 1 and 2. Therein, the reference numerals of FIGS. 1 and 2 of the Schuemann patent have been left for completeness, even though not referred to herein, since a simplified explanation of the operation of such a device will suffice herein.

In FIG. 1, a pump diaphragm 41 which may be an A/C driven piezoelectric diaphragm, forces air out of a pump chamber 43, through a pump orifice 45 directly across an intake chamber 42 and through an outlet orifice 46, thereby to provide fluid under pressure, typically helium or some other inert gas, into fluid conduits or inlets 8, which communicate the fluid under pressure to a plenum chamber 17. The chamber 17 feeds the fluid to a nozzle 21 which directs a jet of the fluid through a jet chamber 7 past the temperature-dependent sensing elements 26, through exhaust ports 32 (FIGS. 1 and 2) and into an exhaust chamber 29 for return to the intake chamber 42. As the jet travels from the nozzle 21 toward the sensor elements 26, any rotation of the apparatus in the plane of sensitivity 5 (FIG. 2) will not be reflected in the differential elements of the fluid which are already traversing the jet chamber 7, so that one or the other of the elements will appear more directly in the stream of the jet and the other one will be less directly in the stream, thereby providing a differential cooling effect on the sensing elements 26. The sensing elements 26 are resistances having a known coefficient of resistance as a function of temperature, and may preferably consist of fine tungsten wires gold-bonded to kovar posts 27. The sensing elements 26 are located as legs of a bridge circuit (of a typical, known type), powered by a suitable power supply, such that the heating effect in the resistive sensing elements 26 by the power supply will cause the elements to assume a certain temperature above ambient (ambient is essentially the temperature of the gas stream), at which the elements have a certain resistance; differential cooling of the elements as a result of the jet action will correspondingly change the resistance thereof, providing a misbalance in the bridge which is sensed as an indication of the angular rate of rotation being undergone by the apparatus. All of this is known in the art and is described more fully in the aforementioned Schuemann patent.

What has been learned, and is the subject matter of the present invention, is that the sensing elements are extremely sensitive, and subject to variations as a function of temperature other than the simple cooling effects caused by the jet. Referring to FIG. 3, the detail of one of the sensing elements 26 is shown. The sensing element 26 comprises a wire, such as tungsten, which may be gold bonded or brazed to the proximal ends of posts 27 made of some conductive material, such as kovar. The posts 27 are mechanically mounted in insulator ferrules 28, which may comprise glass and thereby also serve to insulate the posts 27 from a metallic mounting frame, such as a sensor member or unit 24. The distal ends of the posts 27 may be connected by suitable wires to the electrical bridge which measures the voltage across the sensing elements 26.

As is known, tungsten and kovar have similar, positive temperature coefficients of expansion. With a given ambient temperature and a given power consumption in the sensing elements 26, the sensing elements 26 and the portion of the sensor member 24 between the posts 27 will have certain dimensions, as a function of their respective temperatures. If the temperatures of both increase, their dimensions will both increase; if the temperatures of both decrease, their dimensions will similarly both decrease; and the temperature-dependent increase or decrease in dimension will be about the same in both, since tungsten and kovar have similar coefficients of expansion. But, if the temperature differential between them changes, then their relative dimensions will change. For instance, if the temperature of the tungsten sensing element 26 increased more than that of the kovar sensor element 24 (FIG. 3), the position of the sensing element 26 may increase arcuately (to the right as shown in FIG. 3) as indicated by the dotted line 80. And similarly, decreases in temperature of the sensing element 26 by more than that of the sensor element 24 could cause a straightening of the sensing element 26 so that it appears more to the left as viewed in FIG. 3, as indicated by the dash line 81. One effect that this has is to tend to push the posts 27 apart with increases in temperature differential and tend to draw the posts 27 closer together with decreases in temperature differential. The stresses thus imposed upon posts 27 may cause fracture of the bonds between the sensing element 26 and the posts 27, may cause shifting of the positions of the posts as a result of the balance of thermal and mechanical stresses induced therein, and otherwise alter the positions of the ends of the posts 27.

But in addition, a slight change in the position of the sensing element 26 along the axis of the fluid jet can also alter the cooling effect of the fluid jet on the sensing elements for any given relative position of the sensing elements to the jet. Consider, as a simplified example, the plot of maximum velocity of the fluid jet versus distance from the nozzle as shown in FIG. 4. What this plot indicates is that the maximum velocity of the jet across a cross-section of the angular rate sensing device decreases with distance from the nozzle. This is more specifically illustrated in FIG. 5, which shows plots of velocity of the jet across the jet chamber for three different distances from the nozzle: the uppermost, dotted configuration relating to a position closer to the nozzle than the middle, solid configuration which in turn is closer to the nozzle than the lowermost dashed configuration; in a sense, these correspond respectively to the solid, dotted and dashed lines in FIG. 3. FIG. 5 therefore is a very simplified illustration, exaggerated for purposes of discussion herein, of the manner in which the velocity of the jet may increase and decrease for slight increases and decreases in not only the longitudinal position of the sensing elements 26 (as seen in FIG. 3), but also the lateral position (side to side, in FIGS. 2 and 5). Thus, if the temperature differential between either sensing element 26 and the sensor member 24 and/or posts 27 is allowed to change significantly, the sensing element may bow so as to be closer to the nozzle, straightn so as to be further from the nozzle, or, due to stresses and bending of the posts 27, move to the right or left (FIGS. 2 and 5). Any of these reactions will alter the velocity and therefore the cooling effect of the jet. However, if the temperature differential between the sensing elements 26 and its mountings (sensor element 24 and posts 27) were kept more nearly constant, these effects would be reduced.

According to a first aspect of the present invention illustrated in FIG. 6, a bridge 58 includes the sensing elements 26a, 26b and a pair of fixed reference resistors 63, 64 and is driven by a constant voltage source 55a through additional resistors 26c, 26d which are on the same order of magnitude as the resistances of the sensing elements 26a, 26b. The reference resistors 63, 64 are normally of much larger resistance than the sensing elements 26a, 26b to avoid swamping the effects of differential change in resistance — that is, for maximum sensitivity. The resistors 63 and 64, as in known in the art, are preferably wire wound resistors that are matched so that their resistances track each other with temperature and maintain a constant bridge ratio. On the other hand, the resistors 26c and 26d are selected to be relatively insensitive to or flat with temperature. The result is that the voltage across the bridge 58 is allowed to float with temperature, the voltage difference between it and the voltage of the constant voltage source 55a being taken up by the resistors 26c, 26d. This is in contrast with the known methods of driving such a bridge in the prior art. For instance, if a constant current source were used, the square of the current would remain constant, but the increase in resistance of the sensing elements 26 (a linear function of an increase in temperature) would cause a linear increase in the power consumed thereby. With an increase of power consumed in the resistors, the temperature would further increase, thereby compounding the effects described with respect to FIGS. 3 and 5 hereinbefore. On the other hand, if the bridge were driven by a constant voltage source, the square of the voltage would remain constant, but as the resistance increased linearly with temperature, the power would decrease linearly with temperature, such that there would be a decrease in the temperature differential between sensing element 26 and its mountings (24, 27), thereby aggravating the effects described with respect to FIGS. 3 and 5 hereinbefore. In contrast, the present invention provides for a substantially constant power dissipation in the sensing elements 26, so that the short term average temperature of the sensing elements 26 will remain essentially at some constant differential above the short term average ambient temperature, and therefore the mountings 24, 27. However, the differential cooling of the sensing elements 26a, 26b with respect to each other is uneffected. This is because these elements 26 are maintained at a temperature (such as on the order of 100° C) above the ambient (normally 20° C but subject to variation between −65° C and +125° C). So, the difference in the cooling effect of the jet on each sensing element 26a, 26b due to its pointing more directly at one or the other of them is sufficent to sense the magnitude of the angular rotation responsible therefor.

As examples, the constant voltage supply may impress 2 volts (±1 volt to ground) across the circuit including the bridge and the dropping resistors 26c, 26d. The sensing elements 26a, 26b may be about 8 ohms at 20° C, and the reference resistors 63, 64 may be about 150 ohms. Then, the dropping resistors 26c, 26d would each be about 8 ohms. The total resistance then is 31.19 ohms, the current is about 64.1 ma, and the power in each sensing element is thus about 32.9 mw. If the ambient temperature then increased to +120° C, with a temperature coefficient of resistance of about +0.0042 per ° C, the sensing elements would have a 42% increase to about 11.36 ohms, the total circuit resistance would be 37.57 ohms, the current would be about 53.2 ma and the power in each sensing element 26a, 26b would be about 32.2 mw — which is only about 2% lower than the power at +20° C, above. The dropping resistors 26c, 26d need not have the same resistance as the sensing elements, but maximum temperature dependence is obtained when they do; they should be on the same order of magnitude. Thus variations in stress between the mountings of the sensing elements and variations in their position within the jet stream are minimized as a function of ambient-induced temperature changes, since a more constant temperature differential is maintained.

Another aspect of the present invention is illustrated in FIG. 7. Therein, the same conditions pertain as in FIG. 6, with the exception of the fact that the magnitude of the resistor 64a is reduced slightly and another resistor 63a is added. The purpose of these features is to couple a portion of the temperature-dependent voltage at the node between the dropping resistor 26d and the bridge to the node between the balancing resistors 63, 64a, thereby to compensate for the fact (in the example assumed for illustrative purposes in FIG. 7) that the sensing element 26a has a less positive coefficient or resistivity than that of the sensing element 26b. The resistor 63a couples fixed voltage to the node to compensate, at normal temperature, the effect of the temperature-dependent voltage coupled thereto by reducing the resistance of resistor 63. The reduction of resistor 64a is equivalent to having some higher resistance in parallel therewith to the temperature-dependent voltage node.

Stated alternatively, the resistance of the resistor 64a is made to be unequal from that of the resistor 63 by an amount such that at high ambient temperatures it will cause the bridge to be balanced with a zero angular rate, thereby canceling out temperature-induced variations in the two sensing elements 26a, 26b. The configuration in FIG. 7 assumes that the sensing element 26b has a lower resistance than does the element 26a at the high temperature range of the device, and therefore the resistance of the resistor 64a is lowered a commensurate amount from the resistance of the resistor 63. However, when returned to the nominal operating temperature, the bridge will then be misbalanced because the resistors 26a, 26b will be matched but the resistor 64a will be lower than that of the resistor 63. Therefore, the resistor 63a, which is connected to the constant voltage source 55a, will cause the bridge to be balanced at nominal temperature. This embodiment of the invention may not completely compensate for variations in the resistance of the bridge elements as a function of ambient temperature changes, but will reduce the effects caused by the excursions of difference between the bridge elements. Naturally, the resistor 63 may be the one that is reduced, in which case a resistor would be coupled to the resistor 26d (in place of resistor 63a coupled to resistor 26c). This aspect of the invention can also compensate for temperature-induced differences in the reference resistors 63, 64; but since these do not need to have high temperature coefficients of resistivity (as do the sensing elements, to sense the cooling effect of the jet), they normally will have coefficients over one hundred times smaller than the sensing elements, and thus can be ignored.

Although the various aspects of the present invention have been shown and described with respect to preferred embodiments thereof, it should be understood by those skilled in the art that the foregoing and various other changes, additions and omissions may be made therein and thereto, without departing from the spirit and scope of the invention.

Having thus described exemplary embodiments of my invention, that which I claim as new and desire to secure by Letters Patent is:

1. A fluidic angular rate sensor, comprising:
    means including a nozzle for providing a fluid jet;
    sensing means, disposed in the path of the fluid jet, including a pair of series-connected sensing elements, each having a given resistance at a nominal temperature and a significant temperature coefficient of resistivity;
    a pair of series-connected reference resistors arranged in a bridge configuration by connections to said sensing elements, each having a resistance larger than that of said sensing elements and substantially equal to the other;

a constant voltage power supply having a pair of outputs; and a pair of dropping resistors, each having a resistance on the same order of magnitude as said given resistance, each connecting one of said power supply outputs to a respective one of said connections.

2. A fluidic angular rate sensor according to claim 1 in which a first one of said reference resistors has a lower resistance than the other by an amount to compensate for temperature-dependent variations in said bridge configuration, and further comprising:

a resistor connected from the one of said power supply outputs not connected by one of said dropping resistors to said first reference resistor to the junction of said reference resistors.

* * * * *